United States Patent
Friedrichs et al.

(10) Patent No.: US 12,437,561 B2
(45) Date of Patent: Oct. 7, 2025

(54) METHOD AND SYSTEM FOR DETECTING A TYPE OF SEAT OCCUPANCY

(71) Applicant: Aptiv Technologies AG, Schaffhausen (CH)

(72) Inventors: Klaus Friedrichs, Dortmund (DE); Monika Heift, Schwelm (DE); Thomas Kurbiel, Essen (DE); Xuebing Zhang, Wuppertal (DE); Amil George, Erkrath (DE); Markus Buehren, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 339 days.

(21) Appl. No.: 18/095,694

(22) Filed: Jan. 11, 2023

(65) Prior Publication Data

US 2023/0237814 A1    Jul. 27, 2023

(30) Foreign Application Priority Data

Jan. 21, 2022   (EP) .................................... 22152751

(51) Int. Cl.
*G06V 20/59*    (2022.01)
*G06V 10/25*    (2022.01)
(Continued)

(52) U.S. Cl.
CPC ............ *G06V 20/593* (2022.01); *G06V 10/25* (2022.01); *G06V 10/34* (2022.01); *G06V 10/82* (2022.01)

(58) Field of Classification Search
CPC ...... G06V 10/25; G06V 10/34; G06V 10/454; G06V 10/82; G06V 20/593
See application file for complete search history.

(56) References Cited

U.S. PATENT DOCUMENTS

| 11,193,312 B1* | 12/2021 | Weng ...................... B60R 25/01 |
| 2003/0169906 A1* | 9/2003 | Gokturk ................. G06V 20/59 |
| | | 382/190 |

(Continued)

FOREIGN PATENT DOCUMENTS

| WO | 2020165908 A2 | 8/2020 |
| WO | 2020165908 A3 | 10/2020 |

OTHER PUBLICATIONS

Martin Fritzsche, et al., "Vehicle Occupancy Monitoring with Optical Range-Sensors", IEEE Intelligent Vehicles Symposium, University of Parma, pp. 1-5, Jun. 17, 2004.

(Continued)

*Primary Examiner* — Michael J Vanchy, Jr.
(74) *Attorney, Agent, or Firm* — Harness, Dickey & Pierce, P.L.C.

(57) ABSTRACT

Computer implemented method for detecting a type of seat occupancy, comprising capturing, by means of an imaging device, an image of a seat, the image comprising depth data and intensity data, performing, by means of a processor device, a classifier algorithm on the captured image to determine a level of occupancy, wherein, if the determination indicates that the level of occupancy is above a predetermined threshold, the method comprises processing, by means of the processor device, the depth data with a convolutional neural network, to determine a type of occupation and wherein, if the determination indicates that the level of occupancy is below a predetermined threshold, the method comprises processing, by means of the processor device, the intensity data with a convolutional neural network to determine a type of occupation.

19 Claims, 3 Drawing Sheets

Figure 1:
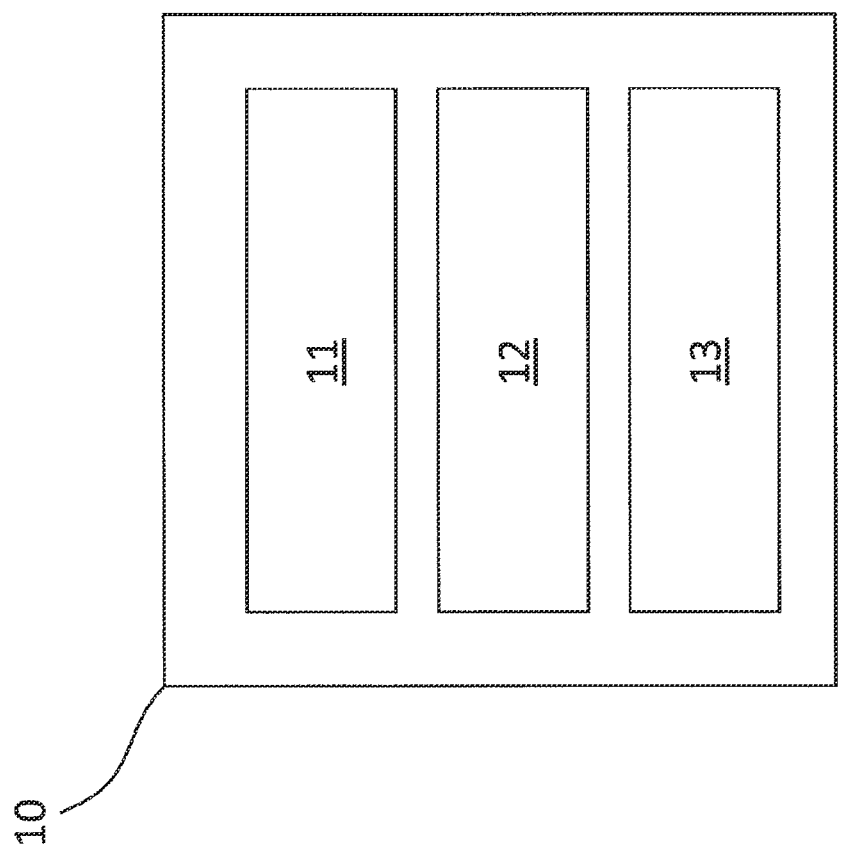

(51) Int. Cl.
*G06V 10/34* (2022.01)
*G06V 10/82* (2022.01)

(56) References Cited

U.S. PATENT DOCUMENTS

| | | | | |
|---|---|---|---|---|
| 2004/0109231 | A1* | 6/2004 | Haisch | G01N 21/6428 |
| | | | | 359/385 |
| 2006/0291697 | A1* | 12/2006 | Luo | G06V 40/103 |
| | | | | 382/104 |
| 2015/0137985 | A1* | 5/2015 | Zafiroglu | G06K 7/10425 |
| | | | | 340/686.1 |
| 2019/0171892 | A1* | 6/2019 | Barth | G06V 10/82 |
| 2019/0251395 | A1* | 8/2019 | Zhang | G06N 7/01 |
| 2021/0008958 | A1 | 1/2021 | Porta | |

OTHER PUBLICATIONS

European Search Report issued by the European Patent Office in connection with International Application No. 22152751.8, dated Jun. 27, 2022.

* cited by examiner

METHOD AND SYSTEM FOR DETECTING A TYPE OF SEAT OCCUPANCY

CROSS-REFERENCE TO RELATED APPLICATION

This application claims the benefit of European patent application serial number EP 22152751.8 filed on Jan. 21, 2022. The entire contents of which are hereby incorporated by reference herein.

FIELD

The present disclosure relates to methods and systems for detecting a type of seat occupancy, in particular in a vehicle.

BACKGROUND

Digital imaging devices, such as digital cameras, are used in automotive applications to detect passenger occupancies in a vehicle.

Thereby, it is important to detect whether a seat is occupied or unoccupied and in particular what type of occupation is present on the seat.

Accordingly, there is a need for improved methods and systems for detecting a seat occupancy.

SUMMARY

The present disclosure provides a computer implemented method, a computer system and a non-transitory computer readable medium according to the independent claims. Embodiments are given in the subclaims, the description and the drawings.

In one aspect, the present disclosure is directed at a computer implemented method for detecting a type of seat occupancy, comprising capturing, by means of an imaging device, an image of a seat, the image comprising depth data and intensity data, performing, by means of a processor device, a classifier algorithm on the captured image to determine a level of seat occupancy. If the determination indicates that the level of seat occupancy is above a predetermined threshold, the method comprises processing, by means of the processor device, the depth data with a convolutional neural network, to determine a type of occupation. If the determination indicates that the level of seat occupancy is below the predetermined threshold, the method comprises processing, by means of the processor device, the intensity data with a convolutional neural network to determine a type of occupation.

The method is in particular suitable for detecting a type of seat occupancy in a vehicle. Therein, the vehicle comprises an imaging device, that is adapted to capture one or more images, in particular of the passenger compartment of the vehicle.

The imaging device may be, for example, located on the inside of the roof of the vehicle, in particular the roof liner, and covering at least a portion of the passenger compartment comprising at least one seat. In particular, the imaging device covers the entire passenger compartment with all seats present therein, in a top view or bird's eye view. Particularly there is only a single imaging device provided.

Therein, the imaging device is adapted to capture one or more images comprising depth data and intensity data. The imaging device may be, for example, a time-of-flight camera, a stereo camera or a radar camera. The depth data represent, for each pixel, a depth information, which corresponds to a real distance in height, and the intensity data represent a luminescence for the corresponding pixel.

Then, a classifier algorithm is processed on the captured image to determine a level of seat occupancy. A level or a degree of seat occupancy may refer to a value how much, in particular how much of the area of the seat is occupied. The classifier algorithm may use in particular only the depth data to determine a level of seat occupancy. This may be done, for example, by comparing a height profile derived from the depth data with a reference height profile to detect differences in the captured height profile. The level of seat occupancy may correspond to a degree of deviation of the captured height profile from the reference height profile of the seat.

If the determination indicates that the level of seat occupancy is above a predetermined threshold, the method comprises processing, by means of the processor device, the depth data with a convolutional neural network, to determine a type of occupation. A type of occupation in this case means, for example, to determine whether a person or a large object, such as a child seat, is present on the seat.

If the determination indicates that the level of seat occupancy is below the predetermined threshold, the method comprises processing, by means of the processor device, the intensity data with a convolutional neural network to determine a type of occupation. A type of occupation in this case means, for example, that the seat is fully empty or only occupied by a small item, but not a person or a child seat.

The predetermined threshold of seat occupancy may be set at 50% of seat occupancy. Alternatively, it may be set at 30% of seat occupancy. Further alternatively, it may be set at 10% seat occupancy. In particular, the threshold may correspond to a certain object size, for example an object that is not larger than 5 cm, 10 cm or 15 cm in width, height and/or depth may be considered as being below the threshold and a correspondingly larger item may be considered as being above the threshold.

Thereby, the two data channels comprising of depth data and intensity data are being used according to their potential. In particular, depth data are particularly suitable to determine an occupancy by a person or a large object while intensity data are particularly suitable to distinguish whether the seat is empty or if a small item is present on the seat.

Through the method it is possible to ignore unnecessary parts of the data and only subject the respective parts of the imaging data to the relevant algorithms. Further, an information overhead may disturb the results of the convolutional neuronal network, which is avoided. Further, computational resource requirements are reduced.

The method may be repeated periodically or in particular upon starting of an engine, shutting down an engine, unlocking a vehicle or locking a vehicle.

According to an embodiment, the method further comprises performing, by means of the processor device, a resizing algorithm on the depth data and/or the intensity data.

In particular, the depth data and/or the intensity data may be resized to be particularly well processable by the convolutional neural network.

According to an embodiment, the classifier algorithm is adapted to determine an estimated seat distance from the image. Therein, the estimated seat distance is used to resize intensity data.

In particular, by deriving the seat distance, which is particularly possible based on the depth data, it is particularly easy to resize the image and in particular to resize the intensity data contained in the image.

According to an embodiment, the method further comprises performing, by means of the processor device, a smoothing algorithm on the depth data.

A smoothing algorithm may, for example, be a median filter. By smoothing the depth data, unwanted noise, which is usually present in depth data more than in intensity data, is filtered out, leading to better results.

According to an embodiment, the method further comprises performing, by means of the processor device, a crop algorithm on the depth data and/or the intensity data.

The crop algorithm may in particular be performed before the resizing and or smoothing algorithm. By cropping the respective data to only the relevant seat area, computational resources are preserved.

According to an embodiment, performing a crop algorithm on the depth data comprises performing a static crop algorithm of the depth data.

The depth data are cropped with a static factor as this channel is particularly provided to distinguish whether there is a person or a child seat occupying the seat, which has to take into account surroundings of the seat, in particular parts of the seat that not only comprise the bottom rest area. Thus, the cropping algorithm is very quick.

According to an embodiment, performing a crop algorithm on the intensity data comprises performing a dynamic crop algorithm of the intensity data.

In contrast to the depth data, the intensity data are particularly provided to distinguish whether the seat is totally unoccupied or if there is a small item present on the seat. Therefore, it is helpful to dynamically crop the intensity data image, to be able to identify also small objects.

According to an embodiment, the classifier algorithm is adapted to determine an estimated seat region from the image. Therein, the estimated seat region is used to dynamically crop the intensity data.

In particular, by deriving the seat region, which is particularly possible based on the depth data, it is particularly easy to determine the exact location on which a small object may have been placed on the seat, in particular the bottom rest in the image.

According to an embodiment the convolutional neural network processing the intensity data is a Siamese convolutional neural network.

Such a Siamese convolutional neural network is particularly suitable to distinguish between an unoccupied seat and a small object being placed on the seat.

According to an embodiment the convolutional neural network processing the intensity data uses a first reference image of an unoccupied seat to determine a type of occupation.

The reference image may be a previously captured image of the same seat in an unoccupied status.

The use of a reference image works particularly well with a Siamese convolutional neural network.

According to an embodiment, the method further comprises defining, by means of the processor device, a previously captured image as a second reference image, if it has been determined for a first predetermined number of times that that the level of seat occupation is above the predetermined threshold, in particular that the seat is occupied.

In particular, if it has been determined that the level of seat occupation is above the predetermined threshold for, for example 5 times, 10 times or 20 times, in particular in a row, without determining that the level of seat occupation is below the predetermined threshold, this might be an indicator that the seat color has changed, for example due to discoloring subject to sunlight or because of a stain, such that the first reference image is not similar enough to the captured image for the convolutional neural network.

In this case, adding a second reference image to the first reference image, with or without replacing the first reference image, improves the detection probability.

The second reference image may in particular be the last captured reference image for which is has been determined that the level of seat occupation is below the predetermined threshold. Therefore, captured images are regularly stored in a memory device. Thus, the second reference image is particularly recent.

According to an embodiment, defining a previously captured image as a second reference image comprises processing, by means of the processor device, a plurality of previously captured images with a convolutional neural network to determine a most relevant previously captured image to be defined as a second reference image.

In this particular embodiment, multiple images from both, a determination that the level of seat occupation is below the predetermined threshold and a determination that the of seat occupation is above the predetermined threshold are used together and compared to determine one most relevance captured image.

According to an embodiment, the method further comprises requesting, by means of the processor device, a user to unoccupy the seat, capturing, by means of the imaging device, an image of the unoccupied seat and defining, by means of the processor device, the captured image of the unoccupied seat as a third reference image.

The user is requested to unoccupy the seat, i.e. to remove items from the seat and clear it. The request may for example be output on an infotainment device of the vehicle. Thereby, it is possible to have a reference image that is most up to date. The third reference image may be used with or without replacing previous reference images.

In another aspect, the present disclosure is directed at a computer system, said computer system being configured to carry out several or all steps of the computer implemented method described herein.

The computer system may comprise a processor device, at least one memory device and at least one non-transitory data storage device. The non-transitory data storage device and/or the memory device may comprise a computer program for instructing the computer to perform several or all steps or aspects of the computer implemented method described herein.

In another aspect, the present disclosure is directed at a non-transitory computer readable medium comprising instructions for carrying out several or all steps or aspects of the computer implemented method described herein. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer implemented method described herein.

DRAWINGS

Figure 2:
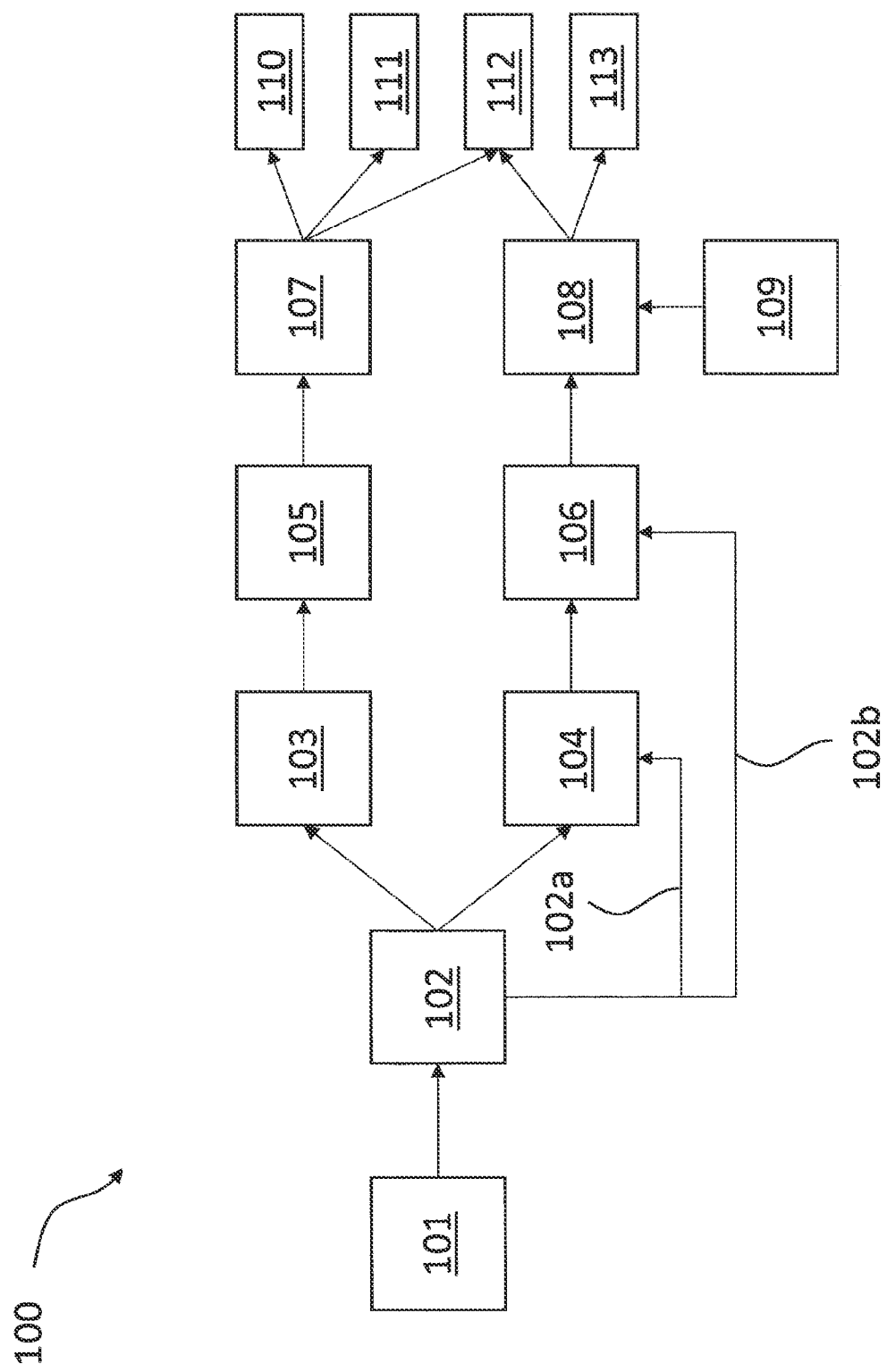
Figure 3:
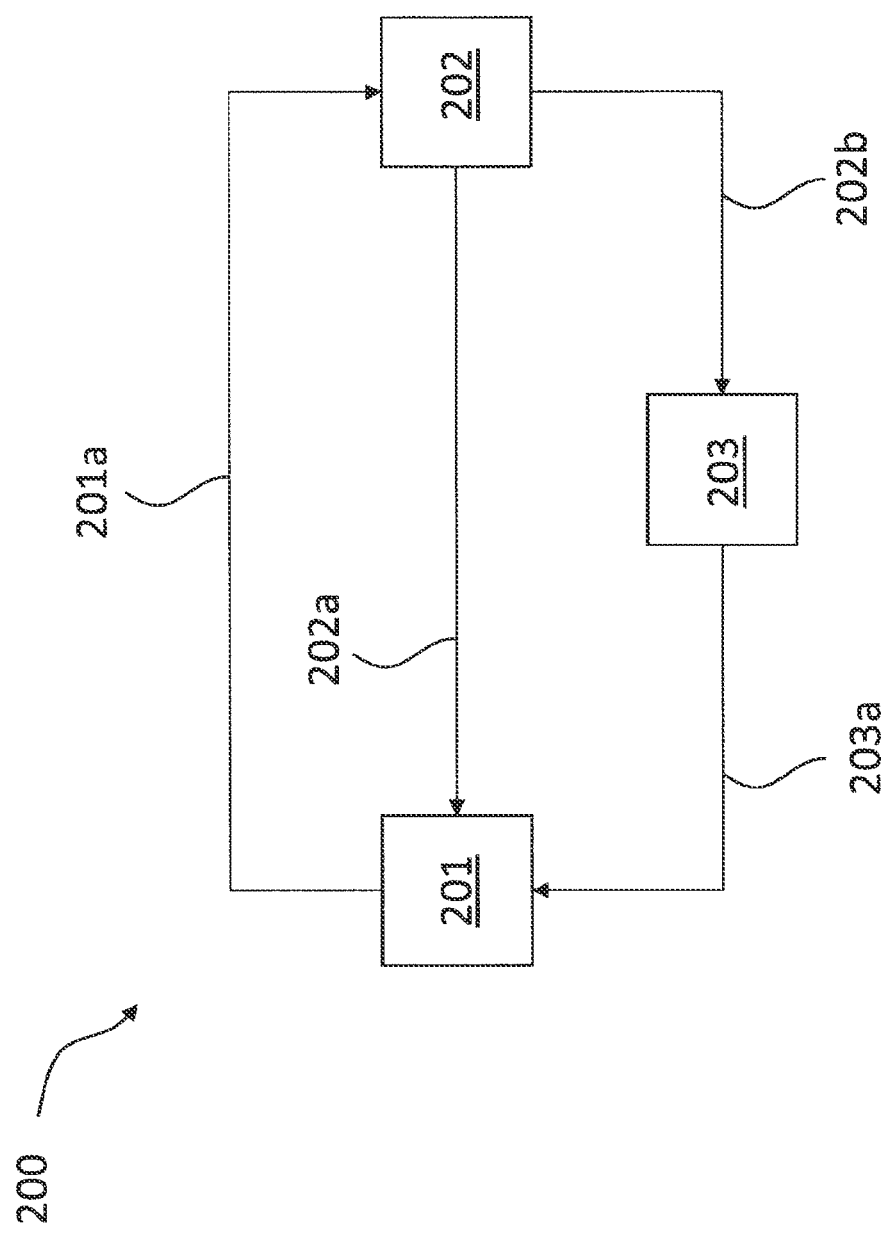

Exemplary embodiments and functions of the present disclosure are described herein in conjunction with the following drawings, showing schematically:

FIG. 1 an embodiment of a computer system for detecting a type of seat occupancy;

FIG. 2 a flow chart of an embodiment of a method for detecting a type of seat occupancy; and FIG. 3 a flow chart of another embodiment of a method for detecting a type of seat occupancy.

DETAILED DESCRIPTION

FIG. 1 depicts an embodiment of a computer system 10 for detecting a type of seat occupancy.

The computer system 10 comprises a processor device 11, an imaging device 12 and a memory device 13.

Therein, the computer system 10 is configured to capture, by means of the imaging device 12, an image of a seat, the image comprising depth data and intensity data, and to perform, by means of the processor device 11, a classifier algorithm on the captured image to determine a level of seat occupancy.

Therein, if the determination indicates that the level of seat occupation is above the predetermined threshold, the computer system 10 is configured to process, by means of the processor device 11, the depth data with a convolutional neural network, to determine a type of occupation.

If the determination indicates that the level of seat occupation is below the predetermined threshold, the computer system 10 is configured to process, by means of the processor device 11, the intensity data with a convolutional neural network to determine a type of occupation.

The computer system 10 is further configured to perform, by means of the processor device 11, a resizing algorithm on the depth data and/or the intensity data.

Therein, the classifier algorithm is adapted to determine an estimated seat distance from the image and the estimated seat distance is used to resize intensity data.

The computer system 10 is further configured to perform, by means of the processor device 11, a smoothing algorithm on the depth data.

The computer system 10 is further configured to perform, by means of the processor device 11, a crop algorithm on the depth data and/or the intensity data.

Therein, performing a crop algorithm on the depth data comprises performing a static crop algorithm of the depth data and performing a crop algorithm on the intensity data comprises performing a dynamic crop algorithm of the intensity data.

The computer system 10 is further configured in that the classifier algorithm is adapted to determine an estimated seat region from the image and the estimated seat region is used to dynamically crop the intensity data.

The computer system 10 is further configured in that the convolutional neural network processing the intensity data is a Siamese convolutional neural network.

The computer system 10 is further configured in that the convolutional neural network processing the intensity data uses a first reference image of an unoccupied seat to determine a type of occupation.

The computer system 10 is further configured to define, by means of the processor device 11, a previously captured image as a second reference image, if it has been determined for a first predetermined number of times that that the level of seat occupation is below the predetermined threshold.

The computer system 10 is further configured in that defining a previously captured image as a second reference image comprises processing, by means of the processor device 11, a plurality of previously captured images with a convolutional neural network to determine a most relevant previously captured image to be defined as a second reference image.

The computer system 10 is further configured to request, by means of the processor device 11, a user to unoccupy the seat, to capture, by means of the imaging device 12, an image of the unoccupied seat and to define, by means of the processor device 11, the captured image of the unoccupied seat as a third reference image.

FIG. 2 depicts a flow chart of an embodiment of a method 100 for detecting a type of seat occupancy.

The method 100 starts at step 101 where an image of a seat is captured, wherein the image comprises depth data and intensity data.

In a next step 102, a classifier algorithm is performed on the captured image to determine a level of seat occupancy.

If the determination in 102 indicates that the level of seat occupancy is below the predetermined threshold, the method continues with step 103 to proceed along the upper path, based on the depth data.

If the determination in 102 indicates that the level of seat occupation is below the predetermined threshold, the method 100 continues with step 104 to proceed along the lower path, based on the intensity data.

Following the upper path in FIG. 1, in a next step 103, a static crop algorithm of the depth data is performed.

Then, in a next step 105, a smoothing and resizing algorithm on the depth data is performed.

In a further step 107, the depth data are processed with a convolutional neural network to determine a type of occupation. This step 107 may lead to the determination 110 that a person is present on the seat.

Alternatively, the step 107 may lead to the determination 111 that a child seat is present on the seat.

Further alternatively, the step 107 may lead to the determination 112, that an object is present on the seat, in particular a large object.

Following the lower path in FIG. 1, in a next step 104 following step 102, a dynamic crop algorithm of the intensity data is performed by using an estimated seat region 102a from the classifier in step 102.

Then, in a next step 106, a resizing algorithm on the intensity data is performed using an estimated seat distance 102b from the classifier in step 102.

In a further step 108, the intensity data are processed with a Siamese convolutional neural network to determine a type of occupation by using a reference intensity image 109 of an empty seat.

This step 108 may lead to the determination 112 that, despite the level of seat occupancy being below the predetermined threshold, an object is actually present on the seat, in particular a small object.

Alternatively, the step 108 may lead to the determination 113 that nothing is present on the seat, i.e. the seat is in fact unoccupied.

FIG. 3 depicts a flow chart of another embodiment of a method 200 for detecting a type of seat occupancy.

In particular, the method 200 as shown in FIG. 3 depicts the selection of a reference image as used in step 109 in FIG. 2.

In particular, the first reference image as used in step 109 may be prerecorded and preprocessed, for example, at the end of production of the vehicle. However, during the life cycle of the car, an appearance of the empty seat may change, either continuously, by attenuation of color, or abruptly, by stains or an applied sating mat.

Therefore, the comparison of step 109 is extended by the method as shown in FIG. 3 and as described in the following.

The standard mode, or default mode, is in step 201, in which one or more reference images are used and the performance is normal. If, however, at some point, no unoccupied seat has been determined for a first predetermined period of time or a first predetermined number of times, it is assumed in path 201a, that the appearance of the unoccupied seat has changed and the method 200 transitions to step 202, which is called redefine mode.

In this redefine mode 202, the system attempts to find a new reference image in recent images. Therein, in order to timely react to small appearance changes, a threshold is defined which defines the maximum distance for empty seats.

Thereby, recent images are compared in order to find similar images at widely disparate points in time as a clear indication for an unoccupied seat, as even the same object may not be positioned in the exact same location.

For this purpose, captured images are regularly stored during the default mode, i.e. in normal operation. To save resources, only such captured images may be stored in which large variations of distance estimations with respect to the reference image occur or after a change in detection type.

By using the Siamese convolutional neuronal network, the stored images are then compared with each other and images with distances below the above-mentioned threshold are clustered together. These cluster may then be analyzed by the number of images and the interval of first and last occurrence.

If for both criteria predetermined requirements are fulfilled, for example at least 3 images and an interval of at least 10 different determinations, the image with the smallest mean distance to the other images of the cluster is chosen as the most relevant one and used as a reference image.

If no cluster fulfills the requirements, the system remains in redefine mode 202 until such a cluster is found or alternatively an unoccupied seat is detected and then follows path 202a back to default mode 201.

If this does not happen for a second predetermined period of time or a second predetermined number of times, the system changes from redefine mode 202 along path 202b to unknown or HMI mode 203.

In this unknown mode 203, the user is requested to clear the seat, whereupon an image is captured, which is then taken as a reference image, transitioning along path 203a back to default mode 201.

REFERENCE NUMERAL LIST 10 computer system
11 processor
12 imaging device
13 memory device
100 method
101 method step
102 method step
102a method step
102b method step
103 method step
104 method step
105 method step
106 method step
107 method step
108 method step
109 method step
110 method step
111 method step
112 method step
113 method step
200 method
201 method step
202 method step
203 method step

The invention claimed is:

1. A computer implemented method for detecting a type of seat occupancy, the method comprising:
   capturing, by means of an imaging device, an image of a seat, the image comprising depth data and intensity data;
   performing, by means of a processor device, a classifier algorithm on the captured image to determine a level of seat occupancy;
   if the determination indicates that the level of seat occupancy is above a predetermined threshold: processing, by means of the processor device, only the depth data with a convolutional neural network, to determine a type of occupancy; and
   if the determination indicates that the level of seat occupancy is below the predetermined threshold: processing, by means of the processor device, only the intensity data with a convolutional neural network to determine the type of occupancy.

2. The computer implemented method according to claim 1, further comprising:
   performing, by means of the processor device, a resizing algorithm on the depth data and/or the intensity data.

3. The computer implemented method according to claim 2, wherein:
   the classifier algorithm is adapted to determine an estimated seat distance from the image; and
   the estimated seat distance is used to resize intensity data.

4. The computer implemented method according to claim 1, further comprising performing, by means of the processor device, a smoothing algorithm on the depth data.

5. The computer implemented method according to claim 1, further comprising performing, by means of the processor device, a crop algorithm on the depth data and/or the intensity data.

6. The computer implemented method according to claim 5, wherein:
   performing the crop algorithm on the depth data comprises performing a static crop algorithm of the depth data.

7. The computer implemented method according claim 5, wherein performing the crop algorithm on the intensity data comprises performing a dynamic crop algorithm of the intensity data.

8. The computer implemented method according to claim 7, wherein;
   the classifier algorithm is adapted to determine an estimated seat region from the image and the estimated seat region is used to dynamically crop the intensity data.

9. The computer implemented method according to claim 1, wherein the convolutional neural network processing the intensity data is a Siamese convolutional neural network.

10. The computer implemented method according to claim 1, wherein the convolutional neural network processing the intensity data uses a first reference image of an unoccupied seat to determine the type of occupation occupancy.

11. The computer implemented method according to claim 10, further comprising:
  if it has been determined for a first predetermined number of times that that the level of seat occupancy is below the predetermined threshold: defining, by means of the processor device, a previously captured image as a second reference image.

12. The computer implemented method according to claim 11, wherein:
  defining the previously captured image as the second reference image comprises:
    processing, by means of the processor device, a plurality of previously captured images with the convolutional neural network to determine a most relevant previously captured image to be defined as the second reference image.

13. The computer implemented method according to claim 12, further comprising:
  requesting, by means of the processor device, a user to unoccupy the seat;
  capturing, by means of the imaging device, an image of the unoccupied seat; and
  defining, by means of the processor device, the captured image of the unoccupied seat as a third reference image.

14. A computer system configured to carry out the computer implemented method of claim 1.

15. A non-transitory computer readable medium comprising instructions for carrying out the computer implemented method of claim 1.

16. The computer implemented method according to claim 1, wherein the predetermined threshold corresponds to a predetermined object size, the method further comprising:
  determining, by means of the processor device and using the depth data, an occupancy by one of a person or an object larger than the predetermined object size; and
  determining, by means of the processor device and using the intensity data, one of whether the seat is empty or whether an object smaller than the predetermined object size is present on the seat.

17. The computer implemented method according to claim 16, wherein the predetermined object size includes a width, a height, or a depth not larger than 5 cm.

18. The computer implemented method according to claim 16, wherein the predetermined object size includes a width, a height, or a depth not larger than 10 cm.

19. The computer implemented method according to claim 16, wherein the predetermined object size includes a width, a height, or a depth not larger than 15 cm.

* * * * *

UNITED STATES PATENT AND TRADEMARK OFFICE
CERTIFICATE OF CORRECTION

| | | |
|---|---|---|
| PATENT NO. | : 12,437,561 B2 | Page 1 of 1 |
| APPLICATION NO. | : 18/095694 | |
| DATED | : October 7, 2025 | |
| INVENTOR(S) | : Klaus Friedrichs et al. | |

It is certified that error appears in the above-identified patent and that said Letters Patent is hereby corrected as shown below:

In the Claims

Column 8, Line 55: In Claim 8, delete "wherein;" and insert --wherein:-- therefor Column 8, Line 66: In Claim 10, after "of", delete "occupation"

Column 9, Line 4: In Claim 11, delete "that that" and insert --that-- therefor

Signed and Sealed this
Twentieth Day of January, 2026

John A. Squires
*Director of the United States Patent and Trademark Office*